United States Patent
Patton

[11] 3,741,360
[45] June 26, 1973

[54] PUMP CONTROLLED PRESSURE MODULATOR FOR REVERSING CLUTCHES

[75] Inventor: Jon R. Patton, Jackson, Mich.

[73] Assignee: Clark Equipment Company, Buchanan, Mich.

[22] Filed: Dec. 29, 1971

[21] Appl. No.: 213,676

[52] U.S. Cl.............. 192/87.19, 192/51, 91/412, 60/428, 192/103 F
[51] Int. Cl............................................. F16d 25/10
[58] Field of Search................. 192/4 A, 4 B, 4 C, 192/13 R, 51, 87.19, 87.18

[56] References Cited
UNITED STATES PATENTS

| | | | |
|---|---|---|---|
| 3,437,184 | 4/1969 | Wilson | 192/4 C |
| 3,618,728 | 11/1971 | McPherson | 192/87.19 |
| 3,498,430 | 3/1970 | Briski | 192/87.19 X |
| 3,348,644 | 10/1967 | Hilpert | 192/4 C |
| 3,458,018 | 7/1969 | Shore | 192/4 C |

FOREIGN PATENTS OR APPLICATIONS

| | | | |
|---|---|---|---|
| 916,731 | 2/1960 | Great Britain | 192/87.19 |

*Primary Examiner*—Benjamin W. Wyche
*Attorney*—Kenneth C. Witt, Robert J. Norton et al.

[57] ABSTRACT

A clutch shift modulation system is disclosed in operative relationship with a transmission having a torque input shaft and a torque receiving shaft. The transmission includes fluid pressure engaged forward and reverse clutches that may be engaged to drivingly rotate the receiving shaft in the respective forward or reverse direction when acted upon by fluid at a selected pressure, and a pump driven by the input shaft is adapted to supply fluid at this pressure to a shift valve which may be moved to a forward or reverse position to selectively connect the pump with the respective clutch through suitable conduits. A reversible pump driven by the receiving shaft pumps fluid in a direction and at a pressure which is a function of the rotative direction and speed of the receiving shaft and this reversible pump is connected between the two conduits leading from the valve to the two clutches so that during shifting it detracts from the efforts of the input driven pump to engage a particular clutch until the rotation of the receiving shaft in the respective opposite direction has slowed to below a selected speed and thereafter aids in the efforts of the input driven pump to engage this clutch.

6 Claims, 1 Drawing Figure

PATENTED JUN 26 1973 3,741,360
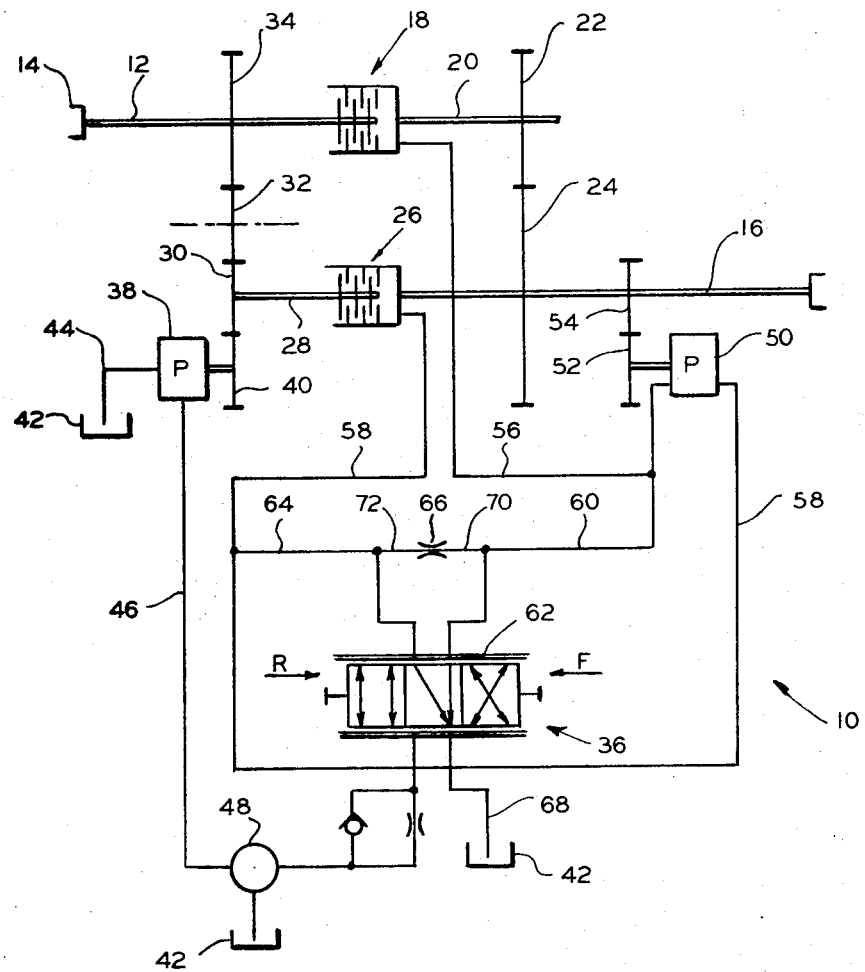

PUMP CONTROLLED PRESSURE MODULATOR FOR REVERSING CLUTCHES

BACKGROUND OF THE INVENTION

Many types of utility vehicles must perform their duties through a work cycle including numerous forward-to-reverse and reverse-to-forward directional changes. Most of these vehicles are powered through a drive train including a mechanical power transmission and these transmissions commonly employ a forward clutch and a reverse clutch which may be selectively engaged to drive the transmission output shaft in the desired rotative direction, thereby propelling the vehicle in the desired direction. An important factor in the performance of such vehicles is the time interval required to change the vehicle direction from forward to reverse, and vice versa, but of at least equal importance is the smoothness with which such directional change occurs since strong and abrupt directional changes may dislodge the load carried by the vehicle, exert undue shock loading upon the vehicle drive train, and provide a generally disagreeable operation for the vehicle operator.

One object of my invention is to provide a simple clutch shift modulation system which provides a precise clutch engaging pressure program during the interval after the forward-reverse lever has been shifted and before the vehicle has reached full speed in the opposite direction, but other objects, features and advantages of my invention will become more apparent to those skilled in the art when the following detailed description of one embodiment thereof is taken in conjunction with the drawing.

SUMMARY OF THE INVENTION

In carrying out my invention in one embodiment thereof I provide a clutch shift modulation system for use with a transmission having a torque input shaft, a torque receiving shaft, and fluid pressure engaged forward and reverse clutches for selectively connecting the input shaft to rotate the receiving shaft in either the respective forward or reverse rotative direction. The clutches are engaged when supplied with fluid at a selected pressure and a pressure supply means adapted to produce this pressure may be connected to either the forward or reverse clutch by a valve means which is shiftable to direct the pressure to the clutches through suitable conduits. A modulating means responsive to the rotative speed and direction of the torque receiving shaft is connected with the conduits leading from the valve means to the clutches and this modulating means modulates the pressure directed to a particular clutch to maintain such pressure below the selected level until the rotation of the receiving shaft in the respective opposite direction has slowed below a selected speed.

DESCRIPTION OF THE DRAWING

The drawing illustrates schematically one simplified form of clutch shift modulation system according to my invention and shows this system in operative relationship with a portion of a simplified mechanical power transmission.

DESCRIPTION OF EMBODIMENT

Referring to the drawing, a schematical representation of one form of clutch shift modulation system embodying this invention is indicated generally by the numeral 10. So that those skilled in the art may more easily understand my invention, I have shown system 10 in operative relationship with a portion of a transmission including a torque input shaft 12 that may be connected through the coupling 14 to be rotated in a given direction by any suitable power source (not shown) and a torque receiving shaft 16 which may be connected through appropriate shafts and gears to deliver power from the transmission.

A fluid pressure actuated or engaged "forward" clutch 18 of any well known design has a portion thereof connected for conjoint rotation with input shaft 12 and another portion thereof connected for conjoint rotation with a shaft 20 so that when clutch 18 is engaged by supplying a selected pressure thereto shaft 20 is connected by means of this forward clutch for conjoint rotation with input shaft 12. A gear 22 is connected for rotation with shaft 20 and meshes with a gear 24 connected for rotation with shaft 16 and it will now be understood that when forward clutch 18 is engaged shaft 16 will be drivingly rotated in a selected direction which may arbitrarily be designated "forward."

A fluid pressure actuated or engaged "reverse" clutch 26 of any well known design has a portion thereof connected for conjoint rotation with shaft 16 and another portion thereof connected for conjoint rotation with a shaft 28. Shaft 28 has a gear 30 connected for rotation therewith which is in mesh with an idler gear 32 that in turn is in mesh with a gear 34 connected for conjoint rotation with input shaft 12 and it will now be understood that when reverse clutch 26 is engaged shaft 16 will be drivingly rotated in a selected direction which may arbitrarily be designated "reverse."

A shift valve shown schematically and indicated generally by the numeral 36 may be manipulated by an operator to selectively condition system 10 for the modulated engagement of forward clutch 18 or reverse clutch 26 as hereinafter explained. Valve 36 contains a number of fluid passage means through which fluid may flow in either direction as will be understood later and the valve may be positioned in either of three positions; the neutral position shown, a forward position by moving valve 36 to the left in the direction indicated by the arrow F, and a reverse position by moving valve 36 to the right in the direction indicated by the arrow R. A pump 38 is connected to be driven by input shaft 12 by means of the gear 40 in mesh with gear 30, and this pump 38 draws fluid from a reservoir 42 through the intake line 44 and supplies such fluid under pressure to valve 36 via the conduit 46. A pressure relief valve 48 is connected between conduit 46 and reservoir 42 and is adapted to maintain the pressure supplied to shift valve 36 through conduit 46 at a level selected to be just sufficient to engage forward clutch 18 or reverse clutch 26 when these clutches are acted upon by fluid at such selected pressure. A reversible pump 50 is connected to be driven by shaft 16 via the gear 52 in mesh with a gear 54 connected for rotation with shaft 16 and this reversible pump is of any of the well known types which may be driven in either rotative direction to produce a flow through the pump in either of two directions, depending upon the direction in which the pump is rotated. A conduit 56 connects one side of reversible pump 50 with forward clutch 18 and a conduit 58 connects the other side thereof with reverse clutch 26 so that either of these clutches might receive pressurized fluid from pump 50 when the pump is operating in an appropriate direction and shift valve 36 is appropriately positioned as hereinafter explained. A conduit 60 connects conduit 56 with the casing 62 of shift valve 36; a conduit 64 connects conduit 58 with casing 62; and conduits 60 and 64 are interconnected through a flow restriction 66 by means of the conduits 70 and 72 respectively. Finally, a return conduit 68 is connected between valve casing 62 and reservoir 42 so that excess fluid within the system may be returned to the reservoir.

Having now described and illustrated a simplified clutch shift modulation system embodying one form of my invention, those skilled in the art will better understand the full breadth of my invention with reference to the operation of system 10. Although input shaft 12 may be rotated at any speed and in either direction, for clarity of explanation here it will be assumed that shaft 12 is rotating at a fixed speed and in a selected rotative direction.

When shift valve 36 is in the neutral position shown in the drawing, forward clutch 18 is vented to reservoir 42 via conduit 56, conduit 60, valve 36, and return line 68; and reverse clutch 26 is vented to reservoir 42 via conduit 58, conduit 64, valve 36 and return line 68 so that neither of these clutches are pressurized to rotate shaft 16 when the shift valve is in this neutral position regardless of the operation of pump 38 or reversible pump 50. If it is desired to engage forward clutch 18 for the rotation of torque receiving shaft 16 in the forward direction shift valve 36 is moved to the left in the direction indicated by the arrow F so that the crossed passages shown schematically in the right hand one-third of valve 36 connect conduit 60 with conduit 46 and connect conduit 64 with return conduit 68. When shift valve 36 is in this forward position pump 38 is connected via conduit 46, conduit 60 and conduit 56 to supply a pressure to forward clutch 18 sufficient to engage the forward clutch for the rotation of shaft 16 in the forward direction and reverse clutch 26 is still vented to reservoir 42 via conduit 58, conduit 64 and return conduit 68. As shaft 16 rotates in the forward direction reversible pump 50 is rotated in a direction adapted to provide a pressure increase thereacross from conduit 58 to conduit 56 to more positively engage forward clutch 18, and when reversible pump 50 is operating in this mode it will be noted that clutch 26 is positively bled by pump 50 via conduit 58; that pump 50 may draw fluid from reservoir 42 via return line 68, valve 36, and conduit 64; and further that any excess fluid pumped by reversible pump 50 may return to reservoir 42 via conduit 60 either by way of flow restriction 66, conduit 72, valve 36, and return conduit 68, or by way of conduit 60, valve 36, conduit 46, and pressure relief valve 48.

If it is desired to engage reverse clutch 26 for the rotation of torque receiving shaft 16 in the reverse direction, shift valve 36 is moved from the neutral position to the right in the direction indicated by the arrow R so that the parallel passages shown schematically in the left hand one-third of valve 36 connect conduit 64 with conduit 46 and connect conduit 60 with return conduit 68. When shift valve 36 is in this reverse position pump 38 is connected via conduit 46, conduit 64 and conduit 58 to supply a pressure to reverse clutch 26 sufficient to engage the reverse clutch for the rotation of shaft 16 in the reverse direction and forward clutch 18 is vented to reservoir 42 via conduit 56, conduit 60, and return conduit 68. As shaft 16 rotates in the reverse direction reversible pump 50 is rotated in a reverse direction adapted to provide a pressure increase thereacross from conduit 56 to conduit 58 to more positively engage reverse clutch 26, and when reversible pump 50 is operated in this mode it will be noted that forward clutch 18 is positively bled by pump 50 via conduit 56; that pump 50 may draw fluid from reservoir 42 via return conduit 68, valve 36, and conduit 60; and further that any excess fluid pumped by reversible pump 50 may return to reservoir 42 via conduit 64 either by way of flow restriction 66, conduit 70, valve 36 and return conduit 68 or by way of conduit 64, valve 36, conduit 46, and pressure relief valve 48.

Having now described the operation of system 10 when shift valve 36 is moved from the neutral position directly to either the forward or the reverse positions, an important feature of my invention will now be described which is provided by the system when shift valve 36 is moved directly from the forward position to the reverse position, or vice versa. Hypothesizing that shift valve 36 is in the forward position, that forward clutch 18 is engaged, and that shaft 16 is rotating in the forward direction so that reversible pump 50 is pumping fluid from conduit 58 to conduit 56, it will be assumed that shift valve 36 is moved in the direction of arrow R directly to the reverse position. Upon the movement of shift valve 36 in such a manner and under these conditions it will be noted that forward clutch 18 is immediately vented to reservoir 42 and therefore immediately disengaged and that although reversible pump 50 continues to pump fluid from conduit 58 to conduit 56 as long as shaft 16 continues to rotate in the forward direction, such flow is vented to reservoir 42 and therefore does not continue to pressurize conduit 56 to a level sufficient to maintain forward clutch 18 in the engaged condition. When valve 36 is moved to the reverse position pump 38 is immediately connected to supply pressurized fluid to conduit 58 and thence to reverse clutch 26 but as long as shaft 16 continues to rotate in the forward direction reversible pump 50 continues to draw fluid from conduit 58 and therefore the pressure supplied to reverse clutch 26 will not be sufficient to engage the clutch 26. When the rotative speed of shaft 16 (and therefore of reversible pump 50) has slowed to a preselected forward speed whereat the pressure supplied by pump 38 to conduit 58 is not substantially reduced by the operation of pump 50, then reverse clutch 26 is engaged to rotate shaft 16 in the reverse direction and the operation of reversible pump 50 is reversed to reinforce this clutch engagement as a function of the increasing speed of shaft 16 in the reverse direction. Such a modulation in the engagement of reverse clutch 26 insures that this clutch will not be engaged until the forward rotative speed of torque receiving shaft 16 has slowed to an acceptable level whereat the components of the transmission drive train will not be exposed to shock loading and the vehicle powered through the transmission will not be subjected to jerky operation.

Completing now the description of the operation of system 10, it will be assumed that shift valve 36 is moved directly to the forward position from the reverse position while reverse clutch 26 is engaged and shaft 16 is rotating in the reverse direction. Upon such movement, reverse clutch 26 is immediately vented to reservoir 42 and therefore immediately disengaged and even though reversible pump 50 continues to pump fluid from conduit 56 to conduit 58 as long as shaft 16 continues to rotate in the reverse direction, such flow is now directly vented to reservoir 42. Reversible pump 50 continues to modulate the pressure supplied by pump 38 to forward clutch 18 as long as shaft 16 is rotating above a selected speed in the reverse direction but when the rotative speed of shaft 16 slows below such speed the forward clutch 18 is engaged to rotate shaft 16 in the forward direction and the operation of reversible pump 50 is reversed to reinforce this clutch engagement.

Although I have described and illustrated herein one form of clutch modulation system embodying my invention, it will be appreciated that other mechanisms may be devised which employ my inventive concept. It should therefore be understood that I intend to cover by the appended claims all systems and modifications as fall within the full spirit and scope of my invention.

I claim:

1. A clutch shift modulation system for vehicular hydraulic transmissions comprising a rotatable torque input member, a torque receiving output member rotatable in a forward direction and in a reverse direction, a pressure actuated forward clutch having one portion thereof connected to be rotated by said input member and another portion thereof connected to rotate said output member, said forward clutch connecting said input member to rotate said output member in said forward direction when said forward clutch is supplied with a predetermined pressure, a pressure actuated reverse clutch having one portion thereof connected to be rotated by said input member and another portion thereof connected to rotate said output member, said reverse clutch connecting said input member to rotate said output member in said reverse direction when said reverse clutch is supplied with a predetermined pressure, pressure supply means including a first hydraulic pump driven by said input member for supplying said selected pressure, direction-selecting valve means having forward and reverse positions, first conduit means connecting said pressure supply means with said valve means, second conduit means connecting said valve means with said forward clutch, third conduit means connecting said valve means with said reverse clutch, said valve means connecting said first conduit means with said second conduit means when said valve means is in said forward position and connecting said first conduit means with said third conduit means when said valve means is in said reverse position, and modulating means to effect a gradual, programmed change from the hydraulic pressure actuation of one of said clutches to the other of said clutches when said valve means is operated to select a reversal in vehicle direction, said modulating means comprising a second hydraulic pump driven reversibly by said output member and having first and second outputs, one output being connected directly to said second conduit means for hydraulic communication therewith and the other output being connected directly to said third conduit means for hydraulic communication therewith whereby said second pump effects an hydraulic pressure which opposes the pressure applied to the newly selected clutch by the first pump as long as the output member rotates in the previously selected direction and which adds to the pressure applied to the newly selected clutch by the first pump when said output member reverses direction to the newly selected direction, the pressure supplied by the first pump being less than the predetermined pressures when opposed by the second pump pressure, but at least equal to the predetermined pressures when aided by the second pump pressure, the clutches being responsive to the resulting gradual pressure increase applied thereto during a direction reversal to engage gradually thereby to prevent sudden engagement of either clutch during a direction reversal, and means for venting pressure supplied by the first pump to the previously engaged clutch upon operation of said valve means to effect a direction reversal.

2. A systems as set forth in claim 1 also including fourth conduit means having a flow restriction therein, said fourth conduit means connecting said second conduit means with said third conduit means.

3. A system as set forth in claim 2 wherein said pressure supply means includes in addition to said first pump, a reservoir, and a relief valve, said pump being connected to be driven by said input member and to draw fluid from said reservoir and supply such fluid under pressure to said first conduit means, said relief valve being connected to said first conduit and to said reservoir to provide means for limiting the pressure in said first conduit means to said selected pressure.

4. A system as set forth in claim 3 and including fifth conduit means, said fifth conduit means connecting said valve means with said reservoir.

5. A system as set forth in claim 4 wherein said valve means connects said third conduit means with said fifth conduit means when said valve means is in said forward position and connects said second conduit means with said fifth conduit means when said valve means is in said reverse position.

6. A system as set forth in claim 5 wherein said valve means has a neutral position, said valve means connecting said second and said third conduit means with said fifth conduit means when said valve means is in said neutral position.

* * * * *